June 13, 1961 V. O. ARMSTRONG 2,988,155
HELICOPTER ROTOR HEAD
Filed Dec. 28, 1959 3 Sheets-Sheet 1
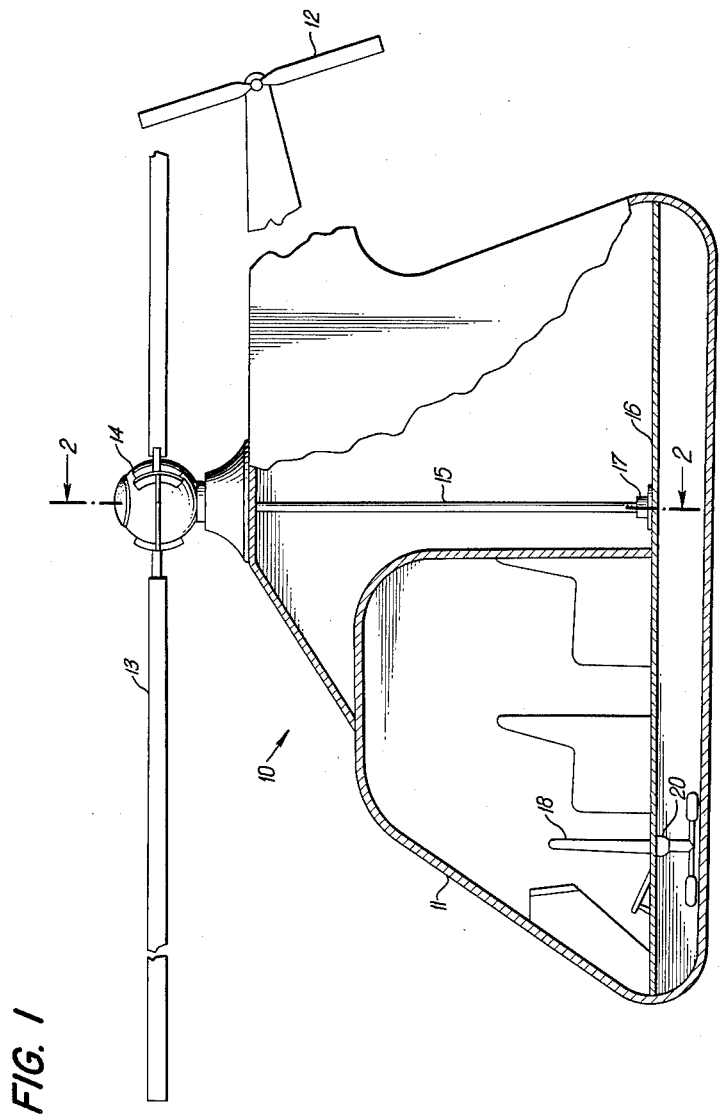
FIG. I
INVENTOR.
VICTOR O. ARMSTRONG June 13, 1961
V. O. ARMSTRONG
2,988,155
HELICOPTER ROTOR HEAD
Filed Dec. 28, 1959
3 Sheets-Sheet 2
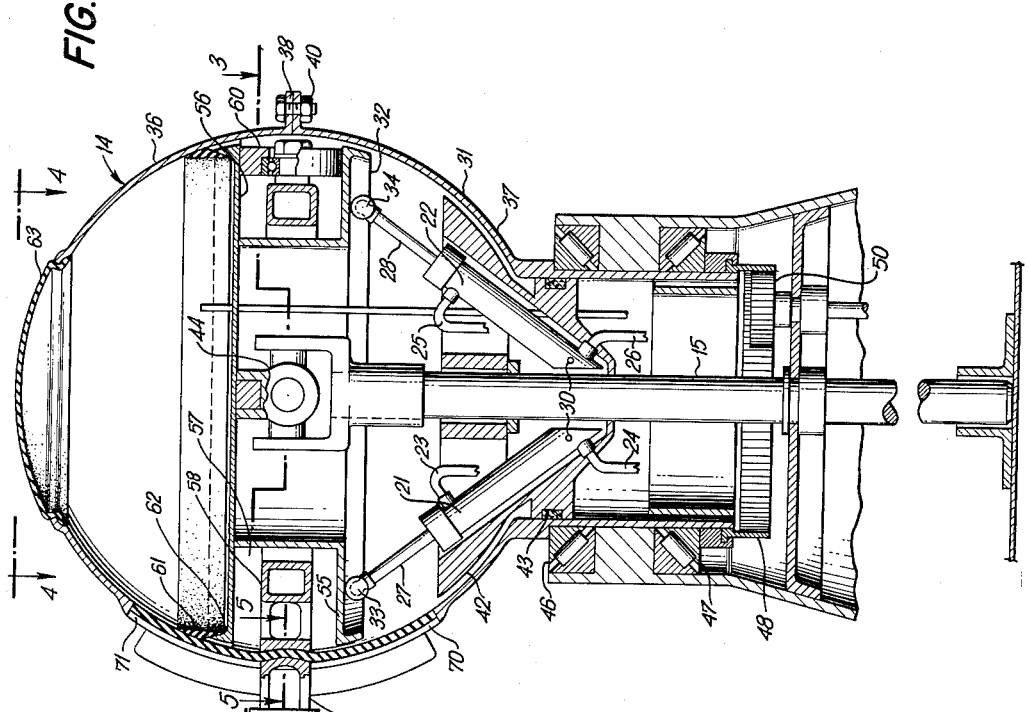
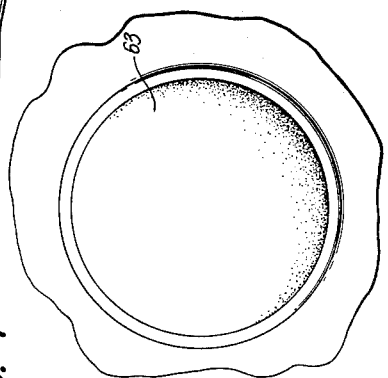
INVENTOR.
VICTOR O. ARMSTRONG June 13, 1961  V. O. ARMSTRONG  2,988,155
HELICOPTER ROTOR HEAD
Filed Dec. 28, 1959  3 Sheets-Sheet 3

INVENTOR.
VICTOR O. ARMSTRONG

United States Patent Office 2,988,155
Patented June 13, 1961

2,988,155
HELICOPTER ROTOR HEAD
Victor O. Armstrong, 13303 Debell, Pacoima, Calif.
Filed Dec. 28, 1959, Ser. No. 862,265
4 Claims. (Cl. 170—160.23)

This invention relates to helicopters and more particularly to a helicopter having a rotor head adapted to dampen and absorb vibrations generated by the rotor blades in flight and which further includes means for reducing friction between moving parts within the rotor head.

In the past, helicopters have employed a variety of universally mounted blades and rotors in which the lift of the helicopter rotor is applied to bearings within the rotor head which in turn apply the load and vibration directly into the fuselage and the passenger compartment of the helicopter. At times, the vibrations and shocks generated by the rotor may be quite severe such as in times of air turbulence and flight conditions such as helicopter over-control. One such helicopter rotor head is shown in my co-pending application Serial Number 614,-510 entitled "Simplified Controls for a Ram Jet Helicopter" filed October 8, 1956, now Patent No. 2,932,353. In my co-pending application, a rotor head is shown which employs an inner sphere which carries the helicopter rotor and is mounted within an outer sphere. This arrangement provides that any number of rotor blade tilting positions may be taken by the inner sphere so that the positioning of the tipped path plane of the rotor blade may be achieved in an infinite number of positions.

In accordance with my invention, my present invention, the inner sphere of such a rotor head is supported on a column of suitable fluid of desired viscosity encased between the inner sphere and the top of the spherical head. Furthermore, the top of the outer spherical head is provided with a flexible membrane which will distort or deflect to effectively absorb any vibrations and shocks transmitted to the rotor head by the rotor blades. In this manner, all moving parts within the rotor head are continually lubricated thereby the reducing friction encountered between moving parts and reflexible membrane assures the absorption of vibration and shocks thereby obviating the transmission of such vibrations into the passenger chamber or compartment of the helicopter.

Therefore, it is a primary object of the present invention to provide a novel rotor head for a helicopter which is capable of absorbing both the normal and abnormal shocks and vibrations encountered by the rotor head which are generated in the head structure by the movable and rotating rotor blades carried by the head.

Another object of the present invention is to provide a novel rotor head for a helicopter which employs a flexible membrane capable of deflection or distortion to effect damping or absorbing of normal and abnormal shock vibrations generated by the rotor blade and transmitted through supporting structure to the rotor head.

Still a further object of the present invention is to provide a novel rotor head, the interior of which is scored a quantity of fluid so that any rotor friction normally encountered between the moving inner blade carrying supporting parts and the outer rotating surface is substantially eliminated for all intensive purposes.

Still a further object of the present invention is to provide a novel rotor head for a helicopter wherein all moving parts associated with the rotation and tilting mechanism of the blades are emerged in a hydraulic lubricant to eliminate friction between moving parts, to effect longer operating life of the parts, and to effect efficient operation of the parts.

A further object of the present invention is to provide a novel rotor head for a helicopter having a ceiling arrangement to permit the storage of a quantity of fluid internally and which will permit the tilting and rotation of the rotor blades without leakage from the rotor head.

Preferred embodiments of the present invention, will be hereinafter described with reference to the accompanying drawings, given by way of example, and in which:

FIGURE 1 is a side elevational view of a helicopter showing a novel rotor head incorporating the present invention;

FIGURE 2 is a sectional view of the rotor head employed in the helicopter of FIGURE 1 taken in the direction of arrows 2—2;

FIGURE 4 is a planned view of the rotor head showing the damping flexible membrane taken in the direction of arrows 4—4 of FIGURE 2.

Figure 3:
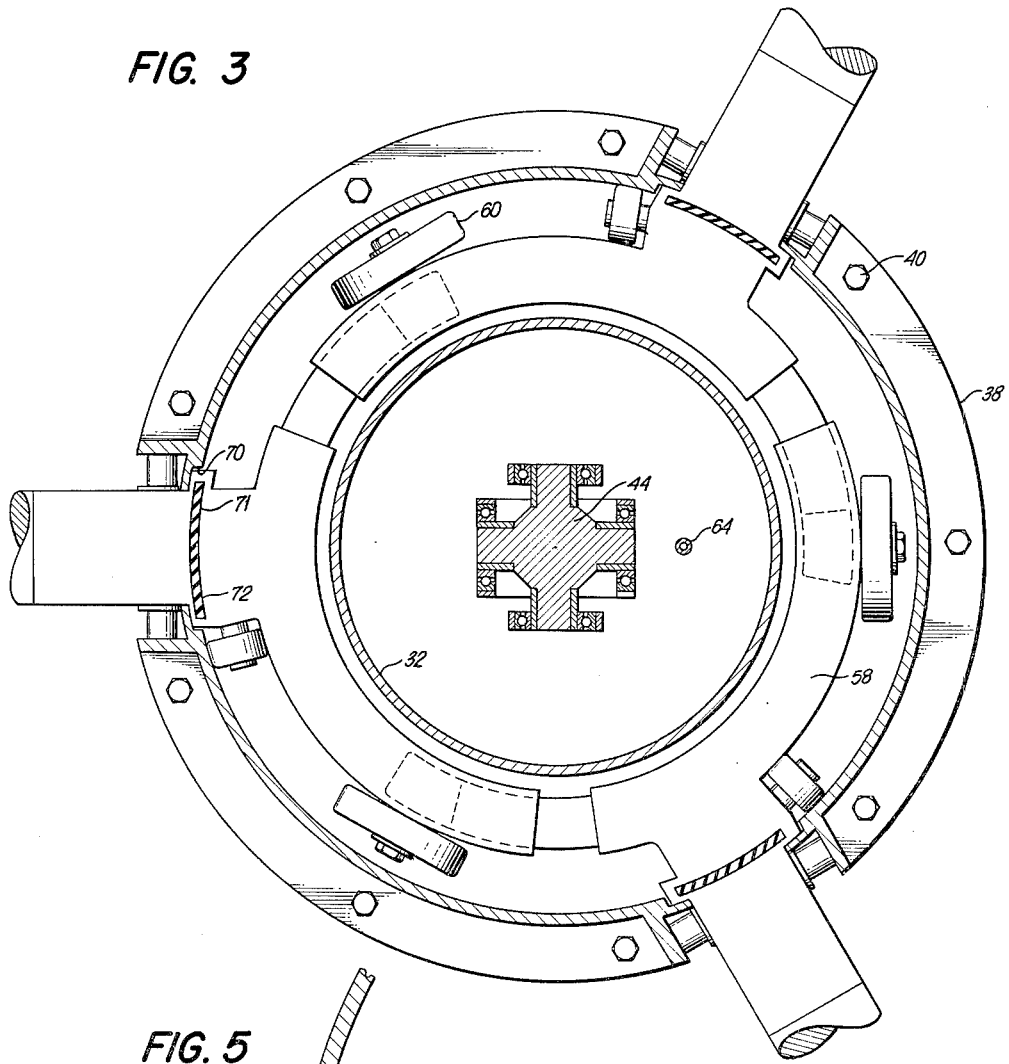
FIGURE 3 is a cross sectional view of the rotor head taken in the direction of arrows 3—3 of FIGURE 2.
Figure 5:
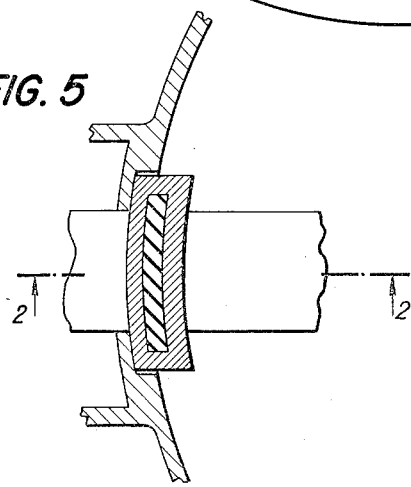
FIGURE 5 is a fragmentary sectional view of the blade sealing means incorporated in the rotor head of FIGURE 2 taken in the direction of arrows 5—5.

With respect to the drawings, FIGURE 1 shows a helicopter incorporating the present invention which comprises, in general, a fuselage 10 adapted to carry passengers in a forward section 11, a tail rotor 12 for stabilizing the helicopter in flight and a plurality of rotor blades, such as blade 13, for providing the necessary lifting forces to elevate and control the direction of helicopter flight. The plurality of rotor blades are shown extending from a spherical head 14 which is rotatably carried on the top of the fuselage. Power for the rotation of the blades may be achieved by any suitable power means such as a power plant carried on the fuselage and suitably connected to the spherical head 14 or the tips of the blades may be provided with a ram jet engine (not shown) such as disclosed in my co-pending application referenced above. However, it is to be noted that the power means does not form a part of the present invention. The blades are supported within the spherical head by means of a retaining shaft 15 shown extending vertically from a floor 16 and as being retained in a fitting 17. The end of the shaft opposite to its end retained on the floor extends through the top of the fuselage into the spherical head and supports the blades therein.

Located in the forward section 11 of the fuslage, there is provided a control stick 18 and a torque tube 20 which is employed in the helicopter control system for positioning the rotor blades to control helicopter flight. The means and the mechanism coupling the control stick and torque bar to the rotor blades for control purposes may consist of any suitable arrangement such as for example, the mechanism shown and disclosed in my aforementioned co-pending application.

The control stick and torque bar are connected by suitable means to a control valve (not shown) which in turn is connected to a pair of actuating cylinders 21 and 22, as shown in FIGURE 2, by means of two pairs of conduits 23, 24 and 25, 26 respectively. Hydraulic fluid is pumped under pressure to the actuating cylinders in such a manner that when actuating cylinder 21 is supplied with pressure to extend its associated piston 27, piston 28 associated with cylinder 22 is retracted.

Actuating cylinders 21 and 22 are attached at one end by pins 30 to a mounting portion 42 of the rotor head 14. The ends of pistons 27 and 28 projecting from cylinders 21 and 22 are connected to the bottom of a control assembly 32 by means of self-aligning bearings 33 and 34 respectively. Although FIGURE 2 shows a pair of cylinders 21 and 22 operating in substantially the same plane, it is to be understood that similar piston and cylinder assemblages and hydraulic lines leading thereto are provided at points 90 degrees with respect to the assemblages 21 and 22 which operate in a plane 90 degrees therefrom as described in the aforementioned patent application. A hollow area 35 within control assembly 32 is provided below the horizontal center line of the control assembly to allow for positioning of the assembly by actuating cylinders 21 and 22 and the respective pair of cylinders disposed 90 degrees therefrom.

The outer sphere of the rotor head is composed of an upper section 36 and a lower section 37 whereby the two sections are provided with annular exteriorly projecting flanges 38 through which bolt and nut arrangements 40 are provided for attaching the sections together. Thus, the upper and lower section of the outer sphere are fabricated in two parts to facilitate assembly and disassembly and to make possible the convenient removal of a blade yoke 41.

The lower section 42 associated with the control assembly 32 is retained from rotating or tilting by being splined to shaft 15. Since the outer sphere 31 will rotate about both the control assembly 32 and lower section 42, a packing means 43 is retained about a portion of lower section engaging the inner surface of the lower portion 37.

Control assembly 32 is splined to the top of a universal joint 44 which is mounted on the extreme upper end of shaft 15. Thereby, it is easily seen that the control assembly 32 is not retained from tilting in any direction and that tilting is achieved simply by actuation of the selected piston and cylinder assemblages which causes the control assembly to tilt about the universal joint 44. The control assembly may be placed in an infinite number of positions about the universal joint by movement of control stick 18 which positions actuating cylinders 21, 22, etc. Control assembly 32 is permitted to move vertically on shaft 15 to accommodate slight vertical movement caused by forces or motion generated by the rotor in various flight conditions. The vertical movement occurs on the splined joint of the control assembly with the universal joint 44.

Outer sphere 31 of the rotor head is mounted on the helicopter fuselage by means of a pair of roller bearings 46 and 47 so that the outer sphere may freely rotate when activated by means of the ring gear 48 when driven by pinion gear 50. Ring gear 48 is suitably attached to the extreme lower end of lower portion 37 of outer sphere 31 and is provided with internal teeth for meshing with external teeth provided on pinion gear 50. It should be appreciated that the drive means for rotor head does not form a part of the present invention and that any suitable powerplant or engine means may be employed.

Control assembly 32 is annular in horizontal cross section and is more movable about its universal joint 44 in a tilting movement within the outer sphere 31. Control assembly 32 is provided with a lower flange means 55 and an upper flange means 56 which, between their outer extremities, define a circular opening or recess 57 for receiving a blade yoke hub 58. About the periphery of the hub 58 projects a plurality of blades fastened to the hub by means of a yoke such as yoke 41 in FIGURE 2. The hub 58 and thereby the blades which are carried thereon, are supported between the upper and lower flanges within annular recess 57 by means of a plurality of rollers such as roller 60. The means of blade retention and blade and hub mounting within the annular recess is similar to the mounting method and mechanism disclosed in the aforementioned co-pending application.

Flange means 56 of the control assembly 32 is provided with an annular resilient sealing means 61 which is fastened to an annular projecting integral portion 62 on the top of flange 56. Sealing means 61 engages with the inner surface of the outer sphere and is in constant contact with the inner surface regardless of the tilting movement of the control assembly. In this manner, suitable lubricant or fluid may be contained within the area confined by the walls of the outer sphere 31, upper flange 56 and a resilient dome diaphragm 63 provided in the top of the outer sphere. Dome 63 is suitably bonded, adhered or affixed to the top of the outer sphere and serves as a damper for absorbing any shocks or vibrations transmitted to the rotor head by either the engine and powerplant or aerodynamic forces affecting the rotor blades while in flight. A fluid or lubricant supply tube 64 is provided which projects through the upper flange 56 into the lubricant storage area for supplying this area with lubricant or fluid. The fluid within the area operates to urge the sealing means into contact with the inner surface of the outer sphere. Any suitable pump means may be employed for supplying the fluid or lubricant through tube 64. A feature of the present invention resides in the fact that the fluid not only acts as a damper in conjunction with the diaphragm 63, but some of the fluid seeps between the working parts, such as between the inner surface of outer sphere 61 and the seal 63 so that all of the parts within the rotor head operate in an environment of fluid or lubricant. This feature substantially provides for friction free operation of all moving parts within the rotor head. The outer sphere 31 is provided with several elongated slots, such as slot 70 in FIGURES 2 and 3, to accommodate vertical displacement of the blade yokes which project through a respective slot. To substantially contain the lubricant within the rotor head, a resilient sealing member 71 is provided which substantially covers the slot. The resilient seal 71 is affixed to the top and the bottom of the slot margin portions by suitable adhesive or bonding and is projected through an aperture 72 provided in each blade yoke 41. It is to be noted that aperture 72 is wide enough to permit yoke 41 to slip over the seal 71 as the blade yoke travels vertically in accordance with the tilting action of the control assembly 32.

From a detailed reading of the foregoing description, it can be seen that the present invention provides a damping means 63 for absorbing shocks and vibrations generated by the rotor blades and that by having an area within the upper sphere 36 which contains a lubricant that all moving parts will be suitably lubricated through seepage between the seal means 61 and the inner surface of the spheres. Thereby, the usual vibrations and loads which are transmitted to the fuselage from the rotor blades are dissipated and eliminated at the rotor head in applicant's invention.

Having described only a typical form of the invention I do not wish to be limited to the specific details herein set forth, but wish to reserve to myself any variations or modifications that may appear to those skilled in the art and fall within the scope of the following claims.

I claim:

1. An aircraft including a fuselage comprising, an outer sphere rotatably secured to the fuselage having a plurality of vertical slots, a fixed lower section located within the outer sphere secured to the fuselage, a movable control assembly adapted to move relative to the fixed portion within the outer sphere, a plurality of rotor blades carried by the control assembly and projecting through the slots of the outer sphere and adapted to follow the movement of the control assembly relative to the fuselage, dynamic sealing means affixed to the periphery of the control assembly adapted to tilt therewith and engageable with the inner surface of the outer sphere, lubricating fluid under pressure enclosed by the outer sphere between the control assembly and the upper inner surface of the outer sphere to eliminate rotating friction, static sealing means secured to the outer sphere covering each slot of the plurality, each rotor blade of the plurality having an aperture to receive the static sealing means associated with each slot constructed and arranged to permit vertical blade movement through the slot without substantial loss of lubricating fluid, piston and cylindrical assemblages connected between the control assembly and the fuselage, a drive mechanism supported on the fuselage operably connected to the outer sphere for rotating the outer sphere about the control assembly, and hydraulic control means supported on the fuselage for selectively actuating the piston and cylinder assemblages for tilting the control assembly respective to the fixed lower section whereby the lift vector of the blades is placed in a desired position.

2. An aircraft including a fuselage comprising, an outer sphere rotatably secured to the fuselage including a resilient member affixed to the outer sphere to provide a resilient dome for the sphere, a fixed lower section enclosed by the outer sphere secured to the fuselage, a movable control assembly positionable relative to the fixed lower section, a plurality of rotor blades carried by the movable control assembly projecting through the outer sphere and being rotatable and positionable therewith relative to the fuselage, dynamic sealing means affixed to the periphery of the control assembly engageable with the inner surface of the outer sphere, lubricating fluid enclosed under pressure by the outer sphere between the control assembly and the upper inner surface of the outer sphere to eliminate rotating friction, static sealing means associated with the outer sphere and the rotor blades to permit vertical movement of the blades without a substantial loss of lubricating fluid, piston and cylinder assemblages operably connected between the movable control section and the fuselage for selectively tilting the control section, a drive mechanism supported on the fuselage and detachably coupled to the outer sphere for rotating the outer sphere, and hydraulic control means supported on the fuselage for selectively operating the piston and cylinder assemblages to tilt the movable control assembly respective to the fixed lower section whereby the lift vector of the blades are placed in a desired position.

3. An aircraft including a fuselage, comprising, an outer sphere rotatably secured to the fuselage above and substantially in the middle thereof, a movable annular control assembly spaced from the fuselage and tiltable respective thereto, universal joint means connecting the movable control assembly to the fuselage, hydraulic piston and cylinder assemblages operably coupling the movable control assembly to the fuselage, a resilient dome secured to the sphere to absorb shocks and vibrations, fluid enclosed by the sphere for transmitting shocks and vibrations to the dome and for eliminating friction, sealing means secured to the outer periphery of the control assembly acceptable to tilt therewith for containing the fluid within the sphere and in pressurized communication with the dome, a plurality of rotor blades carried by the movable control assembly projecting through the outer sphere and adapted to tilt in accordance with the movable control assembly, driving means supported on the fuselage and connected to the outer sphere for rotating the outer sphere respective to the fuselage, flange means projecting from the periphery of the outer sphere and engageable with the plurality of rotor blades for imparting a rotary movement of the outer sphere to the blades, and hydraulic control means supported on the fuselage for selectively operating the piston and cylinder assemblages for selectively tilting the movable control assembly respective to the fuselage whereby the lift vector of the blades is placed in a desired position.

4. An aircraft including a fuselage comprising, an outer sphere rotatably secured to the fuselage having a resilient dome member, the dome member being affixed to the sphere and integrated with the general spherical configuration thereof, a fixed section secured to the fuselage, a movable control assembly tiltable respective to the fixed portion, a plurality of rotor blades carried by the movable control assembly projecting through the outer sphere and adapted to tilt in accordance with the movement of the assembly, a universal joint means connecting the movable control assembly to the fuselage, piston and cylinder assemblages operably connected between the movable control assembly and the fuselage, a quantity of fluid under pressure enclosed by the sphere cooperating with the dome member to absorb shocks and vibrations, and hydraulic control means supported on the fuselage for selectively operating the piston and cylinder assemblages to tilt the movable control assembly respective to the fixed section whereby the lift vector of the blades is placed in a desired position.

References Cited in the file of this patent

UNITED STATES PATENTS

| 2,557,338 | Caldwell | June 19, 1951 |
| 2,932,353 | Armstrong | Apr. 12, 1960 |